United States Patent

Giombanco et al.

(10) Patent No.: US 10,784,785 B2
(45) Date of Patent: Sep. 22, 2020

(54) MONITORING SMPS POWER SWITCH VOLTAGE VIA SWITCH DRAIN SOURCE CAPACITANCE

(71) Applicant: TEXAS INSTRUMENTS INCORPORATED, Dallas, TX (US)

(72) Inventors: Salvatore Giombanco, Cassaro (IT); Filippo Marino, Tremestieri (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/850,177

(22) Filed: Dec. 21, 2017

(65) Prior Publication Data

US 2019/0199196 A1    Jun. 27, 2019

(51) Int. Cl.
    *H02M 3/335*    (2006.01)
    *H02M 1/00*     (2006.01)

(52) U.S. Cl.
    CPC ... *H02M 3/33507* (2013.01); *H02M 3/33515* (2013.01); *H02M 2001/0009* (2013.01); *H02M 2001/0058* (2013.01)

(58) Field of Classification Search
    CPC .. H02M 3/335–3/33576; H02M 1/083; H02M 2001/0009; H02M 1/08; H02M 3/33592; H02M 2001/0058
    See application file for complete search history.

(56) References Cited

U.S. PATENT DOCUMENTS

| | | | | |
|---|---|---|---|---|
| 6,288,501 B1* | 9/2001 | Nakamura | ......... | H05B 41/2886 315/307 |
| 2008/0037294 A1* | 2/2008 | Indika de Silva | ......... | H02M 3/33507 363/21.12 |
| 2013/0258723 A1* | 10/2013 | Fang | ................. | H02M 3/33507 363/21.17 |
| 2013/0280513 A1* | 10/2013 | Itou | .......................... | D01D 5/12 428/221 |
| 2014/0085947 A1* | 3/2014 | Capilla | ............... | H02M 1/4225 363/52 |
| 2014/0268923 A1* | 9/2014 | Valley | ............... | H02M 3/33523 363/21.17 |
| 2016/0255685 A1* | 9/2016 | Melanson | .......... | H05B 33/0815 327/109 |
| 2018/0109195 A1* | 4/2018 | Lin | | |
| 2018/0159433 A1* | 6/2018 | Oe | .................... | H02M 3/33523 |
| 2018/0191271 A1* | 7/2018 | Gionnbanco | ........... | H02M 3/07 |

* cited by examiner

*Primary Examiner* — Gustavo A Rosario-Benitez
(74) *Attorney, Agent, or Firm* — Mark Allen Valetti; Charles A. Brill; Frank D. Cimino

(57) ABSTRACT

A switch-mode power supply includes a power transistor, a transformer, and detection circuitry. The transformer includes a primary winding that is coupled to a drain terminal of the power transistor. The detection circuitry is coupled to a source terminal of the power transistor. The detection circuitry is operable to monitor signal present on the drain terminal via parasitic drain-source capacitance of the power transistor while the power transistor is switched off, and to detect demagnetization of a secondary winding of the transformer via the monitored signal.

17 Claims, 4 Drawing Sheets

MONITORING SMPS POWER SWITCH VOLTAGE VIA SWITCH DRAIN SOURCE CAPACITANCE

BACKGROUND

A switch-mode power supply is an electronic circuit that converts an input direct current (DC) supply voltage into one or more DC output voltages that are higher or lower in magnitude, than the input DC supply voltage. A switch-mode power supply that generates an output voltage lower than the input voltage is termed a buck or step-down converter. A switch-mode power supply that generates an output voltage higher than the input voltage is termed a boost or step-up converter.

Some switch-node power supply topologies include a drive power transistor coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle (such as PWM) of the switch and the frequency of the switching signal (such as PWM-fixed, or PFM). Switch-mode power supplies are widely used to power electronic devices, particularly battery powered devices, such as portable, cellular phones, laptop computers, and other electronic systems in which efficient use of power is desirable.

SUMMARY

A method and apparatus for controlling a switch-mode power supply using drain signal detected via drain-source capacitance of a power transistor are disclosed herein. According to aspects of the disclosure, a switch-mode power supply includes a power transistor, a transformer, and detection circuitry. The transformer includes a primary winding that is coupled to a drain terminal of the power transistor. The detection circuitry is coupled to a source terminal of the power transistor. The detection circuitry is configured to monitor signals present on the drain terminal via a parasitic drain-source capacitance of the power transistor while the power transistor is switched off, and to detect demagnetization of a secondary winding of the transformer via the monitored signals.

In other aspects of the disclosure, a method for controlling a switch-mode power supply includes driving a primary winding of a transformer coupled to a drain terminal of a power transistor. A circuit connected to a source terminal of the power transistor, via a parasitic drain-source capacitance of the power transistor, monitors drain signal present on the drain terminal while the power transistor is switched off. Demagnetization of a secondary winding of the transformer is detected via the drain signal. A feedback signal indicative of an end of demagnetization time is generated based on the detected demagnetization. The feedback signal is provided to circuitry controlling activation of the power transistor.

In a further example, a switch-mode power supply controller includes a power transistor and detection circuitry. The power transistor is configured to drive a primary winding of a transformer coupled to a drain terminal of the power transistor. The detection circuitry is coupled to a source terminal of the power transistor, the detection circuitry is configured to monitor signal present on the drain terminal via a parasitic drain-source capacitance of the power transistor while the power transistor is switched off. The detection circuitry is also configured to detect demagnetization of a secondary winding of the transformer via the signal, and to detect a minimum voltage on the drain terminal via the signal.

BRIEF DESCRIPTION OF THE DRAWINGS

For a detailed description of various examples, reference will now be made to the accompanying drawings in which.

DETAILED DESCRIPTION

Figure 1:
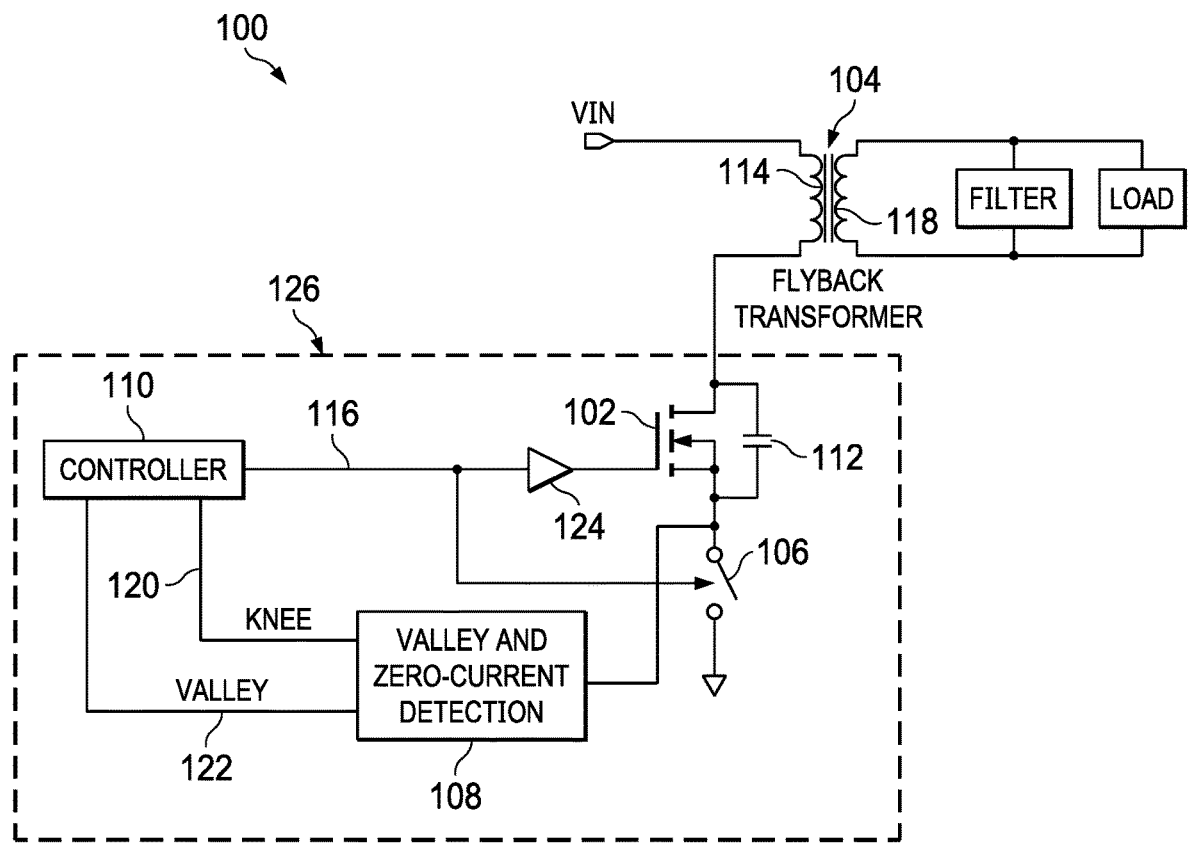
FIG. 1 shows a schematic diagram of an example switch-mode power supply based on an example flyback converter topology, that monitors power switch voltage via drain-source capacitance of the power switch according to the disclosure.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

A switched mode power supply (SMPS) transfers power from an input power source to a load by switching one or more power transistors coupled at a switch node/terminal to an energy storage element (such as an inductor/transformer and/or capacitor), which is coupled to the load. An SMPS regulator includes an SMPS controller to provide on/off gate drive to switch the power transistor(s), which can be external, or integrated with the controller as an SMPS switcher/converter (with a switch node output terminal). The SMPS controller provides switching control with an on/off duty cycle (such as PWM and/or PFM) based on feedback control to regulate output voltage and/or current. In common architectures/topologies (such as non-isolated buck, boost, and buck-boost, and isolated flyback and forward), the SMPS includes as energy storage elements a power inductor and an output/bulk capacitor, which form an LC output filter to supply power to the load at a regulated output voltage. The SMPS regulator switches the power transistor(s) to form circuit arrangements (at the switch node) with the power inductor and output capacitor to supply load current at a regulated output voltage. For example, in buck, boost and buck-boost topologies, an SMPS regulator (controller or converter/switcher) controls duty-cycle (on/off) switching of the power transistor(s) to control a switch node/terminal connected to a power inductor, switching between charge and discharge cycles, with load current supplied by the power inductor and/or the output capacitor (depending on on/off state and the topology), at a regulated voltage maintained on the output capacitor. An SMPS regulator can be configured for operation as a constant current source, with an energy storage element, but with no output/bulk capacitor.

Various applications require that the efficiency of a switch-mode power supply be maximized. For example, compliance with governmental standards, such as U.S. Department of Energy standards, require quasi-resonant operation to minimize power losses in the high voltage power switch. Some applications with isolated converters, such as flyback or forward, use an auxiliary (feedback) transformer winding, and/or additional high voltage components. Both additional windings and additional high voltage components increase power supply cost.

SMPS (isolated) designs based on the present disclosure allow quasi-resonant operation and/or primary side regulation without additional transformer windings or additional high voltage components. The power supply control circuit disclosed herein employs the drain-source capacitance Cds of the high voltage power switch to monitor/sense the voltage on the drain of the high voltage power switch (based on a sensed Cds current proportional to a derivative of the drain voltage). By monitoring the drain voltage via the drain-source capacitance, the disclosed SMPS designs can detect both the end of demagnetization of the transformer secondary winding and the minimum drain voltage (i.e., drain valley) and apply the detected drain voltage states to implement quasi-resonant operation and/or primary side regulation.

FIG. 1 shows a schematic diagram of an example switch-mode power supply (SMPS) 100 that monitors power switch voltage via drain-source capacitance of the power switch according to the disclosure. The switch-mode power supply 100 is an example isolated flyback converter architecture that includes a power transistor switch 102, a flyback transformer 104, a ground switch 106, knee and valley detection circuitry 108, and power supply control circuitry 110. The power transistor 102 may be an N-channel metal oxide semiconductor field effect transistor (MOSFET). A drain terminal of the power transistor 102 is connected to a primary winding 114 of the flyback transformer 104.

The power supply control circuitry 110 generates a drive signal 116 at a controlled duty cycle that switches the power transistor 102 (e.g., via gate driver 124) between on/off states to draw current through the primary winding 114 of the transformer 104, which in turn generates a magnetic field about the secondary winding 118 of the flyback transformer 104. When the power supply control circuitry 110 switches to the off cycle of the drive signal 116, the magnetic field collapses, and current flows in the secondary winding 118. To provide quasi-resonant operation and/or primary side regulation, the voltage on the drain terminal of the power transistor 102 is monitored. The power transistor 102 includes a parasitic capacitor 112 connecting the drain and source terminals of the power transistor 102. In the switch-mode power supply 100, the voltage on the drain terminal of the power transistor 102 is monitored via the parasitic drain-source capacitor 112.

The source terminal of the power transistor 102 is connected to ground via the ground switch 106. The ground switch 106 may be a transistor similar to the power transistor 102. The drive signal 116 or an equivalent suitable control signal generated by the power supply control circuitry 110 closes the ground switch 106, to connect the source terminal of the power transistor 102 to ground while the power transistor 102 is switched on, and opens the ground switch 106, to disconnect the source terminal of the power transistor 102 from ground while the power transistor is switched off.

The knee and valley detection circuitry 108 is connected to the source terminal of the power transistor 102. When the power transistor 102 is deactivated, and the ground switch 106 is opened, the knee and valley detection circuitry 108 monitors the voltage on the drain terminal of the power transistor 102 via the parasitic drain-source capacitor 112. That is, signal on the drain terminal of the power transistor 102 propagates to the source terminal of the power transistor 102 via the parasitic drain-source capacitor 112 allowing the knee and valley detection circuitry 108 to monitor the signal on the drain terminal.

The power transistor 102, ground switch 106, power supply control circuitry 110, and knee and valley detection circuitry 108 may be provided on an example integrated circuit as an SMPS converter/switcher 126. In an alternative example implementation, ground switch 106, power supply control circuitry 110, and knee and valley detection circuitry 108 may be provided on an example integrated circuit SMPS controller, with an external power transistor 102.

Additionally, alternative example switched mode power supplies can be implemented with dual high/low side power transistors, with power transistor 102 as the low side power transistor. Additionally, the methodology for monitoring/sensing drain voltage of a power transistor based on off-state drain-source capacitance Cds can be implemented in SMPS topologies other than flyback, such as isolated forward, and non-isolated boost.

Figure 2:
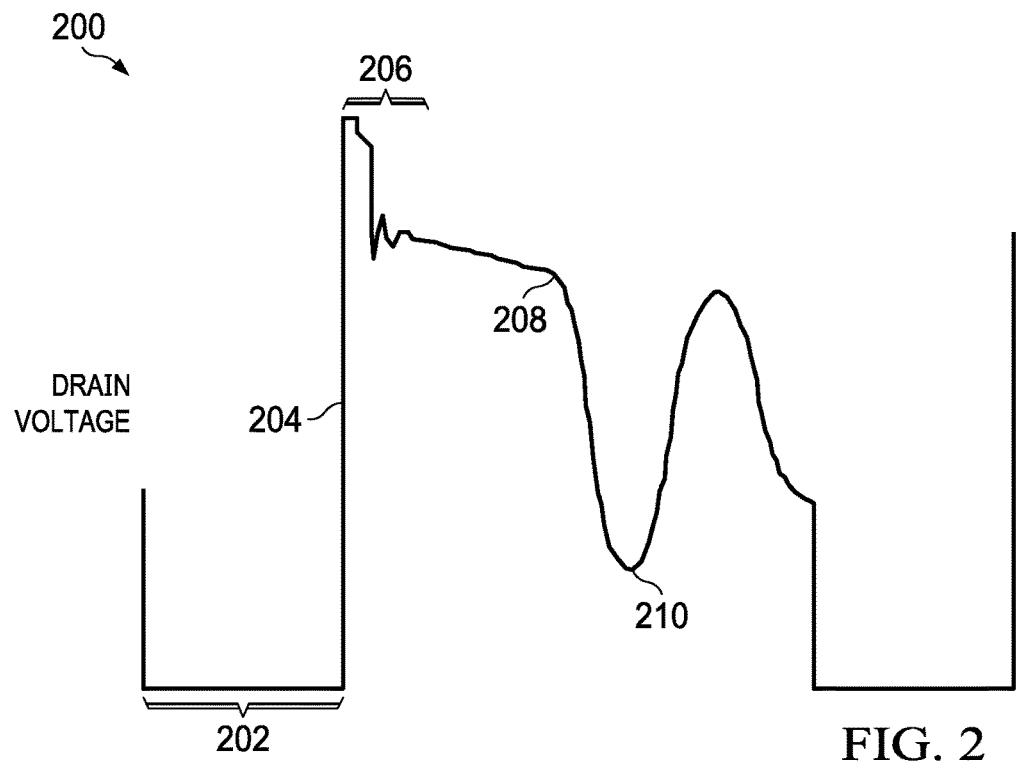
FIG. 2 shows and example plot of power switch voltage monitored via drain-source capacitance of the power switch according to the disclosure.

FIG. 2 shows an example voltage signal 200 on the drain of the power transistor 102. During interval 202, the power transistor 202 is switched on and the ground switch 106 is closed to induce current flow in the primary winding 114 of the flyback transformer 104. At 204, the power transistor 202 is switched off and the ground switch 106 is opened and demagnetization of the secondary winding 118 of the flyback transformer 104 begins. On deactivation of the power transistor 102, the voltage on the drain terminal rings in interval 206. At 208, the "zero current" or "knee" point, the demagnetization of the secondary winding is complete. At 210, the "minimum" drain voltage or "valley" occurs, and the signal 200 rings thereafter. The knee and valley detection circuitry 108 identifies the knee point 208 and the valley point 210 in the signal 200, and provides signals 120 and 122 that identify the timing of the occurrence of the knee 208 and the valley 210 to the power supply control circuitry 110. The power supply control circuitry 110 applies the knee and valley identification signals 120 and 122 to control activation of the power transistor 102, and to thereby provide quasi-resonant operation and/or supply side regulation.

Figure 3:
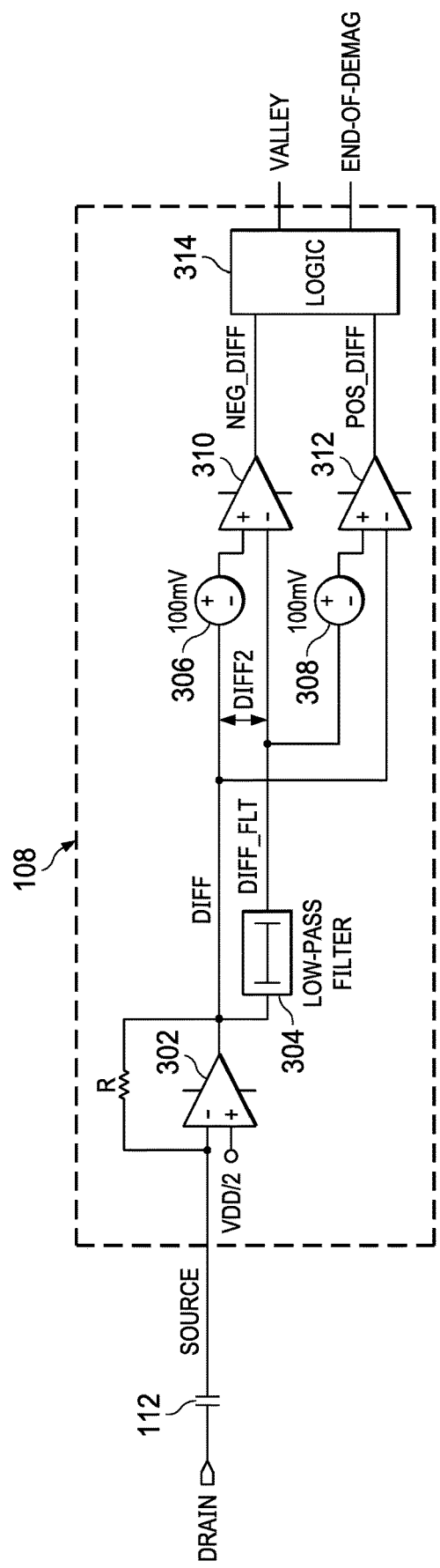
FIG. 3 shows a schematic diagram of example detection circuitry that monitors power switch voltage via drain-source capacitance of the power switch according to the disclosure.

FIG. 3 shows a schematic diagram of example knee and valley detection circuitry 108 according to this disclosure. The knee and valley detection circuitry 108 includes a transimpedance amplifier 302, a delay circuit 304, voltage offset circuits 306 and 308, comparators 310 and 312, and logic circuitry 314. An input of the transimpedance amplifier 302 is connected to the source terminal of the power transistor 102. The transimpedance amplifier 302 converts the Cds current (proportional to a derivative of drain voltage) received via the parasitic drain-source capacitor 112 of the power transistor 102 to a voltage signal corresponding to drain voltage. The delay circuit 304 is coupled to the output of the transimpedance amplifier 302. The delay circuit 304 applies a time delay to the output signal generated by the transimpedance amplifier 302 to produce a delayed version of the transimpedance amplifier output signal. In some examples, the delay circuit 304 may be implemented as a low-pass filter (e.g., one or more RC low-pass filter sections).

The offset circuit 306 applies an offset voltage (e.g., 100 millivolts) to the transimpedance amplifier output signal. The offset circuit 308 applies an offset voltage (e.g., 100 millivolts) to the delayed version of the transimpedance amplifier output signal. The comparator 310 compares the delayed version of the transimpedance amplifier output signal and the offset adjusted output of the transimpedance amplifier. The comparator 312 compares the transimpedance amplifier output signal and the offset adjusted delayed version of the transimpedance amplifier output signal. For example, the comparator 310 may detect whether the offset adjusted transimpedance amplifier output signal rises above the delayed version of the transimpedance amplifier output signal, which may signify detection of the knee 208. Similarly, the comparator 312 may detected whether the transimpedance amplifier output signal falls below the offset adjusted delayed version of the transimpedance amplifier output signal, which may signify detection of the valley 210.

The logic circuitry 314 includes circuitry that generates, based on the outputs of the comparators 310 and 312, knee and valley detection signals 120 and 122 for provision to the power supply control circuitry 110. For example, the logic circuitry 314 may include a first monostable that is triggered by detection of the knee, and a second monostable that is triggered by detection of the valley. The outputs of the monostables may be knee and valley detection pulses 120 and 122 provided to the power supply control circuitry 110.

Figure 4:
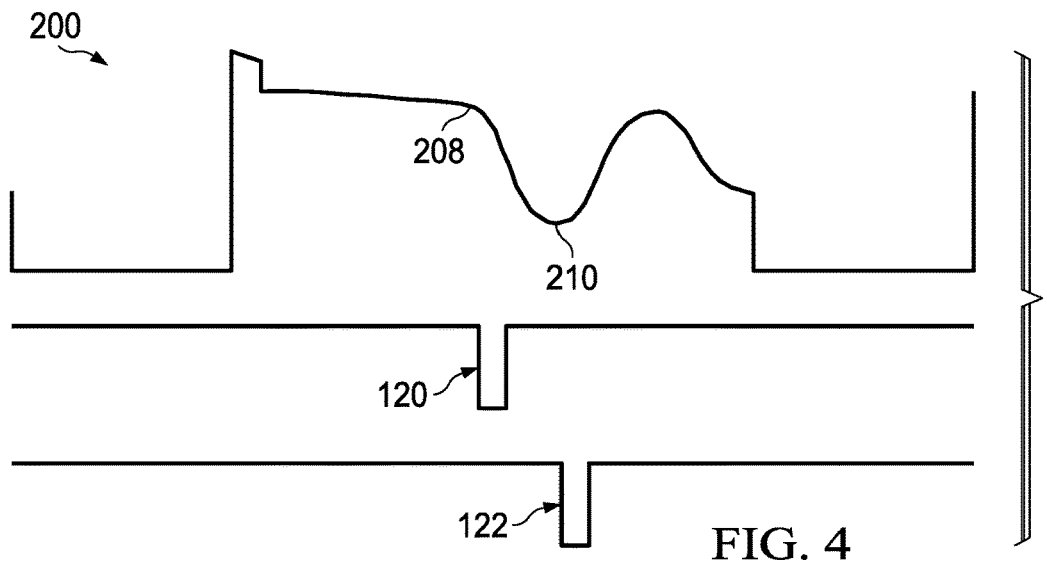
FIG. 4 shows example power switch voltage and control signals generated by monitoring the power switch voltage via drain-source capacitance of the power switch according to the disclosure.

FIG. 4 shows example power switch voltage 200 and signals generated by the logic circuitry 314 as output of the knee and valley detection circuitry 108 according to this disclosure. The signal 120 indicates and coincides with detection of the knee 208, and the signal 122 indicates and coincides with detection of the valley 404.

Figure 5:
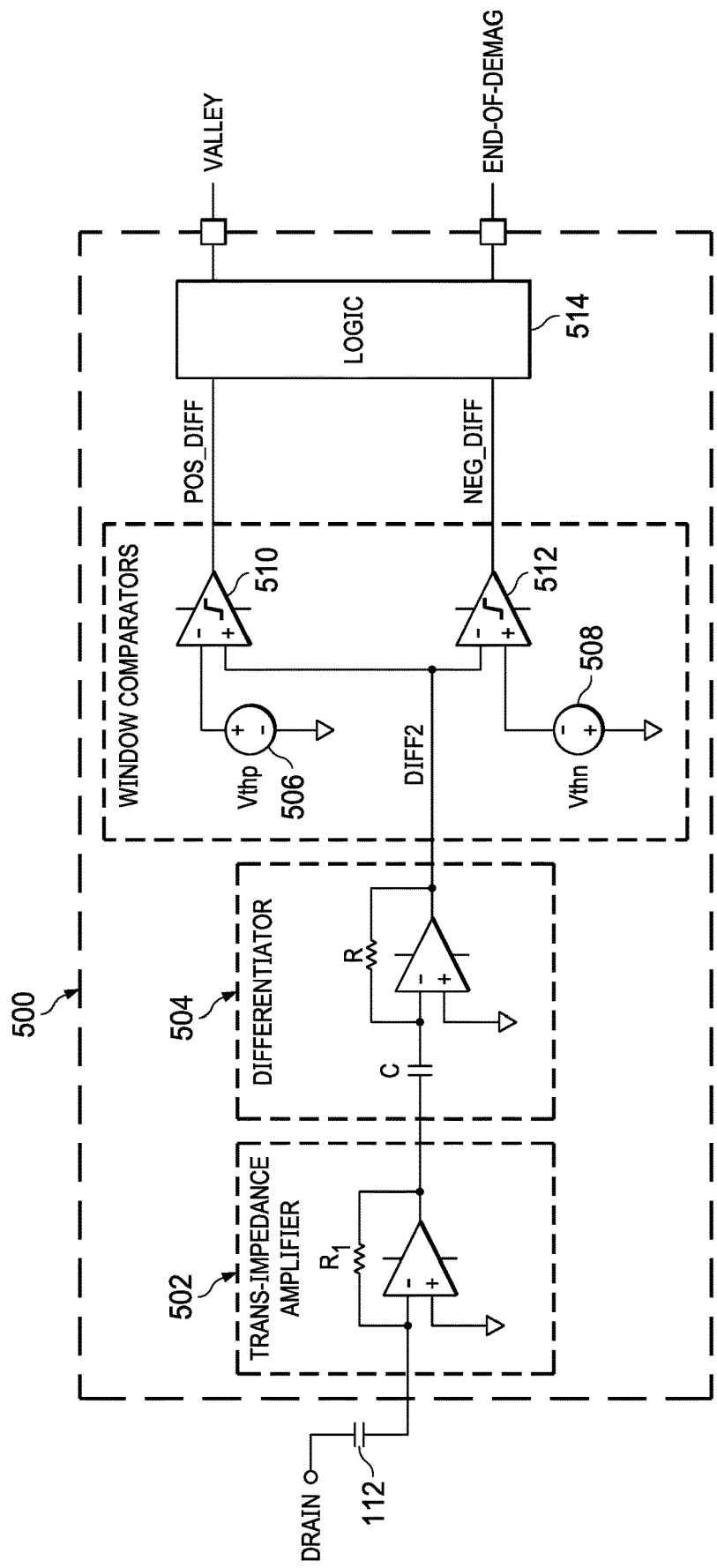
FIG. 5 shows a schematic diagram of an example differentiator based detection circuitry that monitors power switch voltage via drain-source capacitance of the power switch according to the disclosure.

FIG. 5 shows a schematic diagram of an example differentiator based detection circuitry 500 that monitors power switch voltage via drain-source capacitance of the power switch according to this disclosure. The detection circuitry 500 is an example of the knee and valley detection circuitry 108. The detection circuitry 500 includes a transimpedance amplifier 502, a differentiator 504, threshold voltage circuits 506 and 508, comparators 510 and 512, and logic circuitry 514. An input of the transimpedance amplifier 502 is connected to the source terminal of the power transistor 102. The transimpedance amplifier 502 converts a Cds current received via the parasitic drain-source capacitor 112 of the power transistor 102 to a voltage signal. The differentiator 504 is coupled to the output of the transimpedance amplifier 502. The differentiator 504 produces an output signal that is proportional to the rate of change of output signal generated by the transimpedance amplifier 502.

The threshold voltage circuit 506 generates a reference voltage that is applied to the comparator 510. The comparator 510 compares the output of the differentiator 504 to the reference voltage generated by the threshold voltage circuit 506. If the output of the differentiator 504 exceeds the reference voltage generated by the threshold voltage circuit 506, then the comparator 510 generates an output indicating that the rate of change of the output of the transimpedance amplifier 502 in a first direction (rate of change in the positive direction) exceeds the threshold set by the threshold voltage circuit 506.

The threshold voltage circuit 508 generates a reference voltage that is applied to the comparator 512. The comparator 512 compares the output of the differentiator 504 to the reference voltage generated by the threshold voltage circuit 508. If the output of the differentiator 504 is less than the reference voltage generated by the threshold voltage circuit 508, then the comparator 512 generates an output indicating that the rate of change of the output of the transimpedance amplifier 502 in a second direction (rate of change in the negative direction) exceeds the threshold set by the threshold voltage circuit 508.

The logic circuitry 514 includes circuitry that generates, based on the outputs of the comparators 510 and 512, knee and valley detection signals 120 and 122 for provision to the power supply control circuitry 110. For example, the logic circuitry 514 may include a first monostable that is triggered by detection of the knee (e.g., output of the comparator 512), and a second monostable that is triggered by detection of the valley (e.g., output of the comparator 510). The outputs of the monostables may be knee and valley detection pulses 120 and 122 provided to the power supply control circuitry 110.

Figure 6:
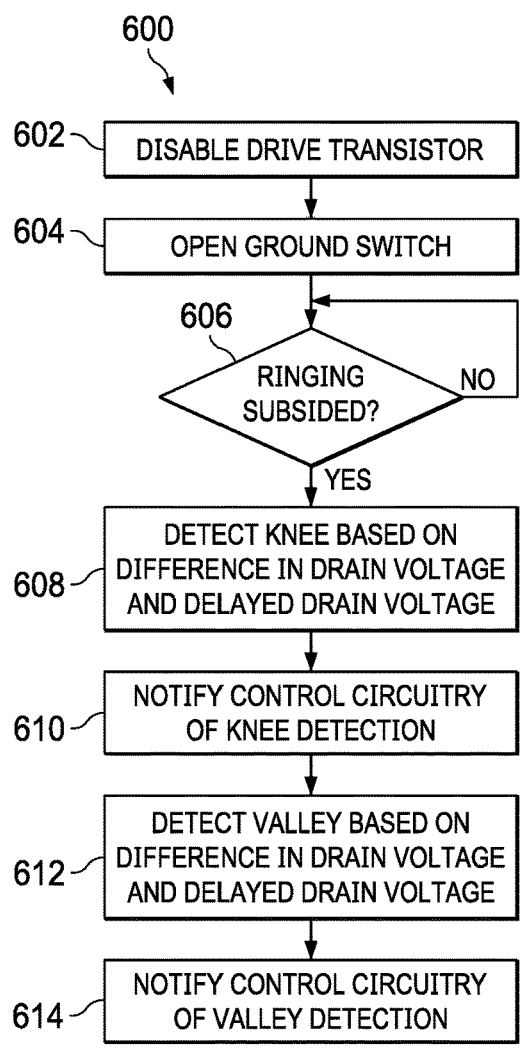
FIG. 6 shows a flow diagram for an example method for monitoring power switch voltage via drain-source capacitance of the power switch according to the disclosure.

FIG. 6 shows a flow diagram for an example method 600 for monitoring power switch voltage via drain-source capacitance of the power switch 102 according to this disclosure. Though depicted sequentially as a matter of convenience, at least some of the actions shown can be performed in a different order and/or performed in parallel. Additionally, some implementations may perform only some of the actions shown. In some implementations, at least some of the operations of the method 600 can be implemented by the switch-mode power supply 100 and/or the knee and valley detection circuitry 108. At initiation of the method 600, the power transistor 102 is driving the primary winding 114 of the flyback transformer 104, which is coupled to the drain terminal of the power transistor 102.

In block 602, the power transistor 102 is switched off. For example, the power supply control circuitry 110 may negate the gate drive signal 116 causing the power transistor 102 to turn off. Turning off the power transistor 102 causes current flow through the primary winding 114 of the flyback transformer 104 to cease. The magnetic field in the secondary winding of the flyback transformer 104 begins to collapse.

In block 604, the ground switch 106 is switched on. The ground switch 106 connects the source terminal of the power transistor 102 to ground while the power transistor 102 is enabled. The source terminal of the power transistor 102 is isolated from ground while the power transistor 102 is switched off to allow the knee and valley detection circuitry 108 to monitor the voltage on the drain terminal of the power transistor 102 via the parasitic drain-source capacitor 112.

In block 606, the knee and valley detection circuitry 108 is monitoring the voltage on the drain terminal of the power transistor 102. The knee and valley detection circuitry 108 determines whether the ringing triggered by deactivation of the power transistor 102 has subsided. For example, each detected oscillation peak of the ringing may reset a timer, where expiration of the timer indicates cessation of ringing.

On determining that ringing has ceased, the knee and valley detection circuitry 108 initiates monitoring for knee and valley occurrence.

In block 608, the knee and valley detection circuitry 108 detects the knee 208. Some examples detect the knee based on a comparison of a voltage signal representative of the voltage on the drain terminal of the power transistor 102 to a delayed version of the voltage signal. The voltage signal may be offset by a predetermined value (e.g., 100 millivolts) to ensure that a detected change in the voltage signal relative to the delayed version of the voltage signal is representative of zero current in the secondary winding of the flyback transformer 104. Some examples detect the knee based on a comparison of a reference voltage to a derivative of a voltage signal representative of the voltage on the drain terminal of the power transistor 102.

In block 610, the knee and valley detection circuitry 108 generates a signal 120 indicating that a knee in the drain voltage signal has been detected. The signal 120 may be a pulse corresponding to the time of knee detection. The knee detection signal 122 may be provided to the power supply control circuitry 110 for use in controlling the power transistor 102.

In block 612, the knee and valley detection circuitry 108 detects a valley in the voltage signal. In some examples, valley detection may be triggered by knee detection in block 608. In some examples, to detect the valley, the knee and valley detection circuitry 108 compares a voltage signal representative of the voltage on the drain terminal of the power transistor 102 to a delayed version of the voltage signal. The delayed version of the voltage signal may be offset by a predetermined value (e.g., 100 millivolts) to ensure that a detected change in the voltage signal relative to the delayed version of the voltage signal is representative of the minimum voltage (i.e., the valley) on the drain terminal of the power transistor 102. Some examples detect the valley based on a comparison of a reference voltage to a derivative of a voltage signal representative of the voltage on the drain terminal of the power transistor 102.

In block 614, the knee and valley detection circuitry 108 generates a signal 122 indicating that a valley in the drain voltage signal has been detected. The signal 122 may be a pulse corresponding to the time of valley detection. The valley detection signal 122 may be provided to the power supply control circuitry 110 for use in controlling the power transistor 102.

The above discussion is meant to be illustrative of the principles and various examples provided by this disclosure. Numerous variations and modifications will become apparent to those skilled in the art once the above disclosure is fully appreciated. It is intended that the following claims be interpreted to embrace all such variations and modifications.

What is claimed is:

1. A switch-mode power supply, comprising: a power transistor with a drain-source capacitance (Cds); an energy storage inductance coupled to a drain terminal of the power transistor; and conversion circuitry coupled to a source terminal of the power transistor, operable when the power transistor is switched off to convert a Cds current signal from the Cds to a first derivative voltage signal corresponding to a first order derivative of a voltage on the drain terminal, and to convert the first derivative voltage signal to a second derivative voltage signal corresponding to a second order derivative of the voltage on the drain terminal; and wherein the conversion circuitry includes detection circuitry to detect demagnetization of the energy storage inductance based on the first and second derivative voltage signals; and further comprising a switch coupled to the source terminal of the power transistor, the switch to disconnect the source terminal from a reference voltage while the power transistor is switched off.

2. The switch-mode power supply of claim 1, wherein the conversion circuitry is operable to detect a minimum voltage on the drain terminal via the first and second derivative voltage signals.

3. The switch-mode power supply of claim 1, wherein the energy storage inductance comprises a transformer with a primary winding coupled to the drain terminal and a secondary winding coupled to a load.

4. The switch-mode power supply of claim 1, wherein the conversion circuitry is operable to generate a pulse indicating an end of demagnetization of the energy storage inductance.

5. The switch-mode power supply of claim 1, wherein the conversion circuitry comprises current-to-voltage conversion circuitry including a transimpedance amplifier to convert the Cds current signal to the first derivative voltage signal.

6. The switch-mode power supply of claim 5, wherein the conversion circuitry further comprises a delay element to apply to a time delay to the first derivative voltage signal to generate the second derivative voltage signal.

7. The switch-mode power supply of claim 6, further comprising window comparison circuitry including:
a first comparator to determine whether the first derivative voltage signal exceeds the second derivative voltage signal by at least a first predetermined amount; and
a second comparator to determine whether the second derivative voltage signal exceeds the first derivative voltage signal by at least a second predetermined amount.

8. The switch-mode power supply of claim 7, further comprising window comparison circuitry, and wherein:
the conversion circuitry further comprises a differentiator to generate the second derivative voltage signal as a derivative of the first derivative voltage signal from the transimpedance amplifier;
the window comparison circuitry includes:
a first comparator to determine whether the second derivative voltage signal exceeds a first threshold voltage; and
a second comparator to determine whether the second derivative voltage signal is less than a second threshold voltage.

9. A method for controlling a switch-mode power supply, comprising: driving an energy storage inductance with a power transistor having a drain terminal coupled to the energy storage inductance, the power transistor having a drain-source capacitance (Cds); when the power transistor is switched off: converting a Cds current signal from the Cds to a first derivative voltage signal corresponding to a first order derivative of a voltage on the drain terminal; converting the first derivative voltage signal to a second derivative voltage signal corresponding to a second order derivative of the voltage on the drain terminal; detecting demagnetization of the energy storage inductance via the first and second derivative voltage signals; generating a demagnetization signal indicative of an end of demagnetization time based on the detected demagnetization; and using the demagnetization signal indicative of the end of demagnetization time to control activation of the power transistor; and further comprising disconnecting a source terminal of the power transistor from a reference voltage while the power transistor is switched off.

10. The method of claim 9, further comprising:
   detecting a minimum voltage on the drain terminal via the first and second derivative voltage signals;
   generating the demagnetization signal as indicative of time of detection of the minimum voltage; and
   providing the demagnetization signal indicative of time of detection of the minimum voltage to the controller.

11. The method of claim 9, wherein the energy storage inductance comprises a transformer with a primary winding coupled to the drain terminal and a secondary winding coupled to a load.

12. The method of claim 11, further comprising generating the second derivative voltage signal by one of: applying a time delay to the first derivative voltage signal to produce a delayed first derivative voltage signal; or differentiating the first derivative voltage signal.

13. The method of claim 9, further comprising comparing the first derivative voltage signal to the second derivative voltage signal to determine:
   whether the first derivative voltage signal exceeds the second derivative voltage signal by at least a predetermined amount; and
   whether the second derivative voltage signal exceeds the first derivative voltage signal by at least the predetermined amount.

14. A switch-mode power supply converter for use in a switch-mode power supply including an energy storage inductance, comprising: a power transistor to drive the energy storage inductance, the power transistor having a drain terminal coupleable to the energy storage inductance, the power transistor having a drain-source capacitance (Cds); and conversion circuitry coupled to a source terminal of the power transistor, operable when the power transistor is switched off: to convert a Cds current signal from the Cds to a first derivative voltage signal corresponding to a first order derivative of a voltage on the drain terminal, and to convert the first derivative voltage signal to a second derivative voltage signal corresponding to a second order derivative of the voltage on the drain terminal; and detection circuitry to detect, based on the first and second derivative voltage signals: demagnetization of a secondary winding of the transformer; and a minimum voltage on the drain terminal; and further comprising a switch coupled to the source terminal of the power transistor, the switch to disconnect the source terminal from a reference voltage while the power transistor is disabled.

15. The switch-mode power supply converter of claim 14, wherein the energy storage inductance comprises a transformer with a primary winding coupled to the drain terminal and a secondary winding coupled to a load.

16. The switch-mode power supply converter of claim 14, wherein the conversion circuitry includes one of:
   a delay circuit to apply to a time delay to the first derivative voltage signal to produce a delayed first derivative voltage signal as the second derivative voltage signal; or
   a differentiator to differentiate the first derivative voltage signal to generate the second derivative voltage signal.

17. The switch-mode power supply converter of claim 15, further comprising window comparison circuitry including:
   a first comparator to determine whether the second derivative voltage signal exceeds a first threshold voltage; and
   a second comparator to determine whether the second derivative voltage signal is less than a second threshold voltage.

* * * * *